(12) United States Patent
Maruyama

(10) Patent No.: US 7,123,847 B2
(45) Date of Patent: Oct. 17, 2006

(54) IMAGE PROCESSING APPARATUS HAVING A STATUS HOLDING FUNCTION, AND IMAGE PROCESSING SYSTEM INCLUDING THE SAME

(75) Inventor: Teruyuki Maruyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 812 days.

(21) Appl. No.: 10/061,333

(22) Filed: Feb. 4, 2002

(65) Prior Publication Data

US 2002/0105670 A1 Aug. 8, 2002

(30) Foreign Application Priority Data

Feb. 5, 2001 (JP) ............... 2001-027753

(51) Int. Cl.
*G03G 15/00* (2006.01)

(52) U.S. Cl. ............... 399/19; 399/9; 399/37; 358/1.15; 358/1.16

(58) Field of Classification Search ............... 358/1.14, 358/1.15, 1.16; 395/101, 114; 399/9, 19, 399/37
See application file for complete search history.

(56) References Cited

U.S. PATENT DOCUMENTS

| | | | |
|---|---|---|---|
| 5,241,659 A | | 8/1993 | Parulski et al. ............ 358/1.16 |
| 5,287,434 A | * | 2/1994 | Bain et al. ............. 235/462.15 |
| 5,400,243 A | * | 3/1995 | Oheda et al. ............... 715/531 |
| 5,754,782 A | * | 5/1998 | Masada ....................... 709/213 |
| 5,845,057 A | * | 12/1998 | Takeda et al. ............. 358/1.15 |
| 5,898,824 A | | 4/1999 | Kato et al. ................... 345/589 |
| 5,974,232 A | | 10/1999 | Kamiya ....................... 709/328 |
| 6,078,934 A | * | 6/2000 | Lahey et al. ................. 715/511 |
| 2001/0035973 A1 | * | 11/2001 | Kusumoto ................. 358/1.14 |
| 2002/0105670 A1 | | 8/2002 | Maruyama |

FOREIGN PATENT DOCUMENTS

| | | |
|---|---|---|
| EP | 0 478 355 | 5/1996 |
| EP | 0 987 604 | 3/2000 |
| EP | 1 043 885 | 10/2000 |
| WO | WO 00/69164 | 11/2000 |

OTHER PUBLICATIONS

U.S. Appl. No. 10/061,333, filed Feb. 4, 2002, Maruyama.
U.S. Appl. No. 10/665,347, filed Sep. 22, 2003, Maruyama.
U.S. Appl. No. 10/792,540, filed Mar. 4, 2004, Nakamura et al.
U.S. Appl. No. 10/915,437, filed Aug. 11, 2004, Maruyama.

* cited by examiner

*Primary Examiner*—Kimberly Williams
*Assistant Examiner*—Peter K Huntsinger
(74) *Attorney, Agent, or Firm*—Oblon, Spivak, McClelland, Maier & Neustadt, P.C.

(57) ABSTRACT

In an image processing apparatus of the present invention, an image storage device stores a plurality of image data. A status holding unit holds a status table having respective status descriptors, corresponding to the plurality of image data stored in the image storage device, each status descriptor indicating a status of execution of a series of image processing steps of the image data related to the status descriptor, and being updated every time one of the image processing steps of the related image data is performed.

4 Claims, 9 Drawing Sheets

SHORT-TERM IDENTIFIER = 4

| OFFSET | STATUS DESCRIPTOR |
|---|---|
| 1 | 111111001 |
| 2 | 110111001 |
| 3 | 111111011 |
| 4 | 010000001 |
| ⋮ | ⋮ |
| 3000 | 010011101 |

STATUS DESCRIPTOR

BIT 1 : IMAGE/APPENDIX IS STORED IN HDD OR NOT
BIT 2 : IMAGE/APPENDIX IN HDD IS DELETED OR NOT
BIT 3 : IMAGE/APPENDIX IN HDD IS CHANGED OR NOT
BIT 4 : THUMBNAIL IS CREATED OR NOT
BIT 5 : APPENDIX IS REGISTERED IN HDD OR NOT
BIT 6 : APPENDIX IS SENT TO BACKUP SERVER OR NOT
BIT 7 : IMAGE IS SENT TO BACKUP SERVER OR NOT
BIT 8 : SENDING OF APPENDIX TO BACKUP SERVER IS NEEDED OR NOT
BIT 9 : SENDING OF IMAGE TO BACKUP SERVER IS NEEDE OR NOT

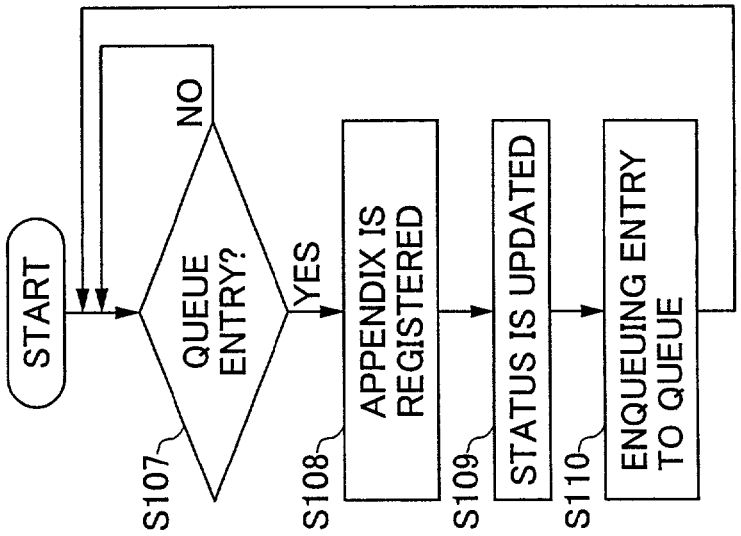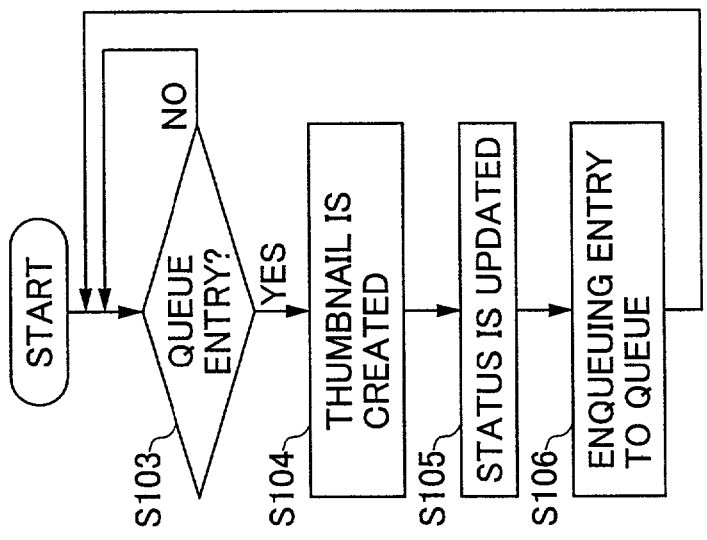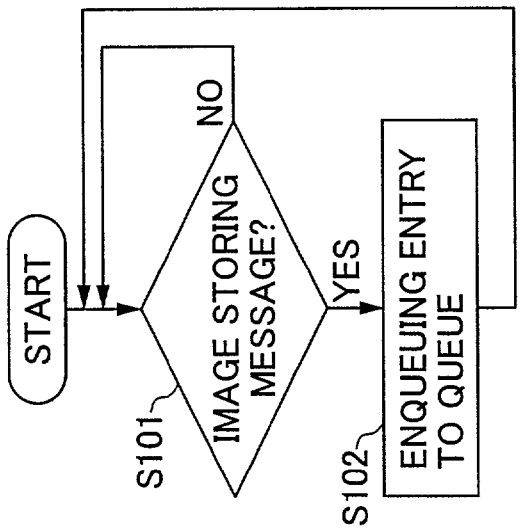

IMAGE PROCESSING APPARATUS HAVING A STATUS HOLDING FUNCTION, AND IMAGE PROCESSING SYSTEM INCLUDING THE SAME

BACKGROUND OF THE INVENTION

1. Field of the Invention

The present invention relates to an image processing apparatus that receives image data and performs a series of image processing steps of the image data, and requires taking corrective measures for the series of image processing steps at the time of power-down.

2. Description of the Related Art

Conventionally, an image processing apparatus that receives image data and performs a series of image processing steps of the image data is known. Moreover, an image processing system or image filing system, which includes the image processing apparatus and an external device for giving image processing instructions to the image processing apparatus, is known. In the image processing system, the image processing apparatus performs a series of image processing steps of an image data file which is received and stored in the image processing apparatus, and uses a plurality of queues corresponding to the image processing steps in cooperation with the execution of the series of image processing steps.

When power-down occurs in a conventional image processing system during the execution of the series of image processing steps, the execution of some of the image processing steps may be suspended due to the power-down. It is necessary to restart the execution of such suspended image processing steps when the system is powered up again after the power-down. However, it is difficult for the conventional image processing system to restart the execution of such suspended image processing steps after the execution of the series of image processing steps is terminated due to the power-down. In particular, in the case of the conventional image processing system including the image processing apparatus provided with an image reader, it is likely that the power-down and the power-up events frequently occur, and it is difficult to restart the execution of such suspended image processing steps when the system is powered up again after the power-down.

SUMMARY OF THE INVENTION

An object of the present invention is to provide an improved image processing apparatus in which the above-described problems are eliminated.

Another object of the present invention is to provide an image processing apparatus that reliably maintains the status of the execution of the series of image processing steps of the image data even when the execution of some of the image processing steps is suspended due to power-down, and can restart the execution of such suspended image processing steps based on the status of the execution when the image processing apparatus is powered up again after the power-down.

Another object of the present invention is to provide an image processing system including an image processing apparatus provided therein, the image processing apparatus reliably maintaining the status of the execution of the series of image processing steps of the image data even when the execution of some of the image processing steps is suspended due to power-down, and can restart the execution of such suspended image processing steps based on the status of the execution when the image processing apparatus is powered up again after the power-down.

The above-mentioned objects of the present invention are achieved by an image processing apparatus comprising: an image storage device which stores a plurality of image data; and a status holding unit which holds a status table having respective status descriptors, corresponding to the plurality of image data stored in the image storage device, each status descriptor indicating a status of execution of a series of image processing steps of the image data related to the status descriptor, and being updated every time one of the image processing steps of the related image data is performed.

The above-mentioned objects of the present invention are achieved by an image processing system including: an image processing apparatus which has an image storage device storing a plurality of image data; a backup server which receives the image data from the image storage device and stores the received image data as a backup; and a communication unit which provides data communication between the image processing apparatus and the backup server by connecting the image processing apparatus with the backup server via a communication line, wherein the image processing apparatus comprises a status holding unit which holds a status table having respective status descriptors, corresponding to the plurality of image data in the image storage device, each status descriptor indicating a status of execution of a series of image processing steps of the image data related to the status descriptor, and being updated every time one of the image processing steps of the related image data is performed.

In the image processing system of the present invention, the image processing apparatus is configured to include the image storage device, the status holding unit and the control unit, wherein the image storage device stores various image data, the status holding unit holds the status table having the respective status descriptors, corresponding to the image data, each status descriptor indicating a status of the execution of the series of image processing steps of the related image data, and the control unit performs the status table update procedure, the image data deletion procedure, and the image processing control procedure. Accordingly, the image processing apparatus of the present invention makes it possible to hold the status of the execution of the series of image processing steps even when the execution of some of the image processing steps is suspended due to power-down. It is possible for the image processing apparatus of the present invention to easily restart the execution of such suspended image processing steps based on the held status of the execution when the image processing apparatus is powered up again after the power-down.

BRIEF DESCRIPTION OF THE DRAWINGS

Other objects, features and advantages of the present invention will be apparent from the following detailed description when read in conjunction with the accompanying drawings.

FIG. 5A, FIG. 5B and FIG. 5C are flowcharts for explaining routines of a status table update procedure performed by the image processing apparatus of the present embodiment.

DETAILED DESCRIPTION OF PREFERRED EMBODIMENTS

A description will now be provided of preferred embodiments of the present invention with reference to the accompanying drawings.

Figure 1:
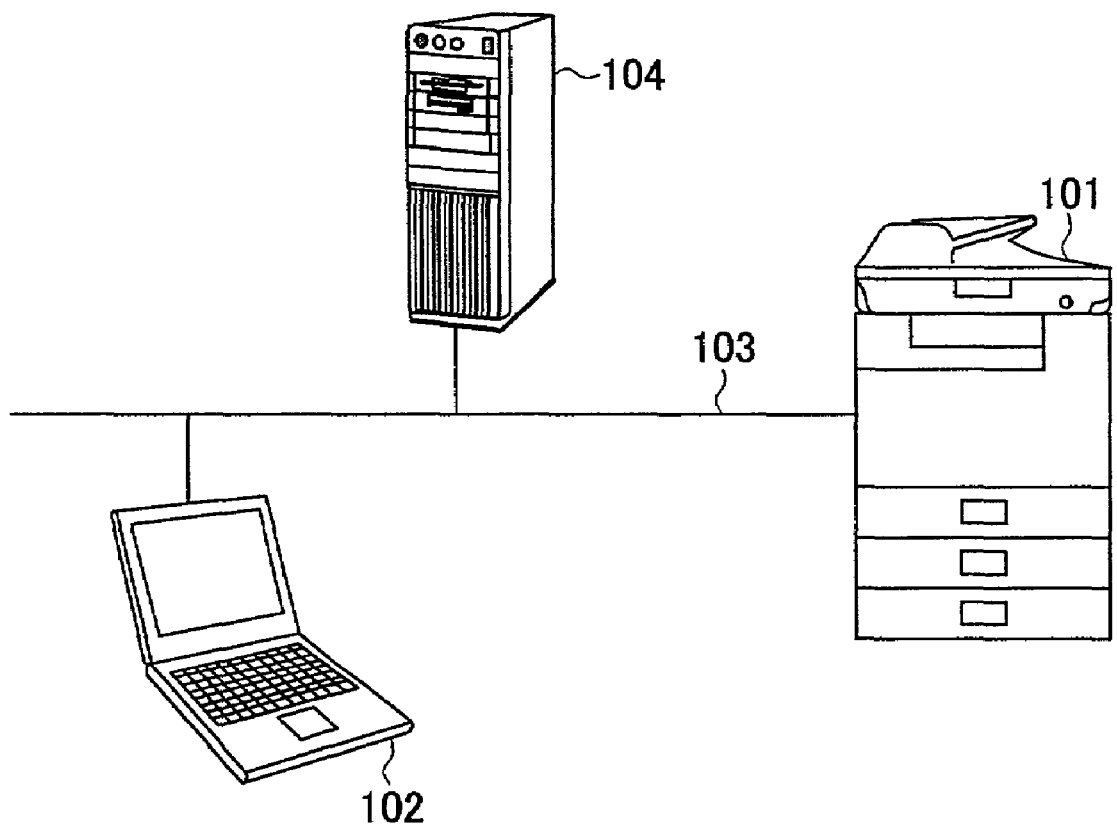
FIG. 1 is a diagram showing an image processing system according to one aspect of the present invention.

FIG. 1 shows an image processing system according to one aspect of the present invention. As shown in FIG. 1, the image processing system generally includes a digital copier 101, a personal computer 102 and a backup server 104, and these components are interconnected by a LAN (local area network) cable 103. The digital copier 101 is an image processing apparatus that receives image data and performs a series of image processing steps of the image data. The image processing apparatus 101 stores the image data and its appendix information. The personal computer 102 has functions of accessing and handling the image data (or documents) stored in the digital copier 101. The backup server 104 includes a hard disk drive (HDD) or a DVD drive that accesses a DVD-write-once medium. The backup server 104 receives the image data and the appendix information from the digital copier 101 and stores and manages the image data and the appendix information for a period longer than a period of storage in the digital copier 101. These components are connected onto the LAN cable 103 so that the data communications between them can be performed. Further, the digital copier 101 is connected to a public telephone network, such as ISDN or PSTN, (not shown in FIG. 1) while it is connected onto the LAN cable 103.

In the above-described embodiment, the image processing system is constructed by using the LAN cable 103. Alternatively, the image processing system may be constructed by using another network interface connected to the Internet. Moreover, in the above-described embodiment, the personal computer 102 has the functions of accessing and handling the image data stored in the digital copier 101. Alternatively, an external operation device which has the functions of accessing and handling the image data of the image processing apparatus 101 may be connected to the image processing apparatus 101 via an interface unit, and the interface unit may be constructed as a communication device that is provided instead of the LAN network. Further, the personal computer 102 may be replaced by a different workstation provided within the image processing system and connected onto the LAN cable 103.

Figure 2:
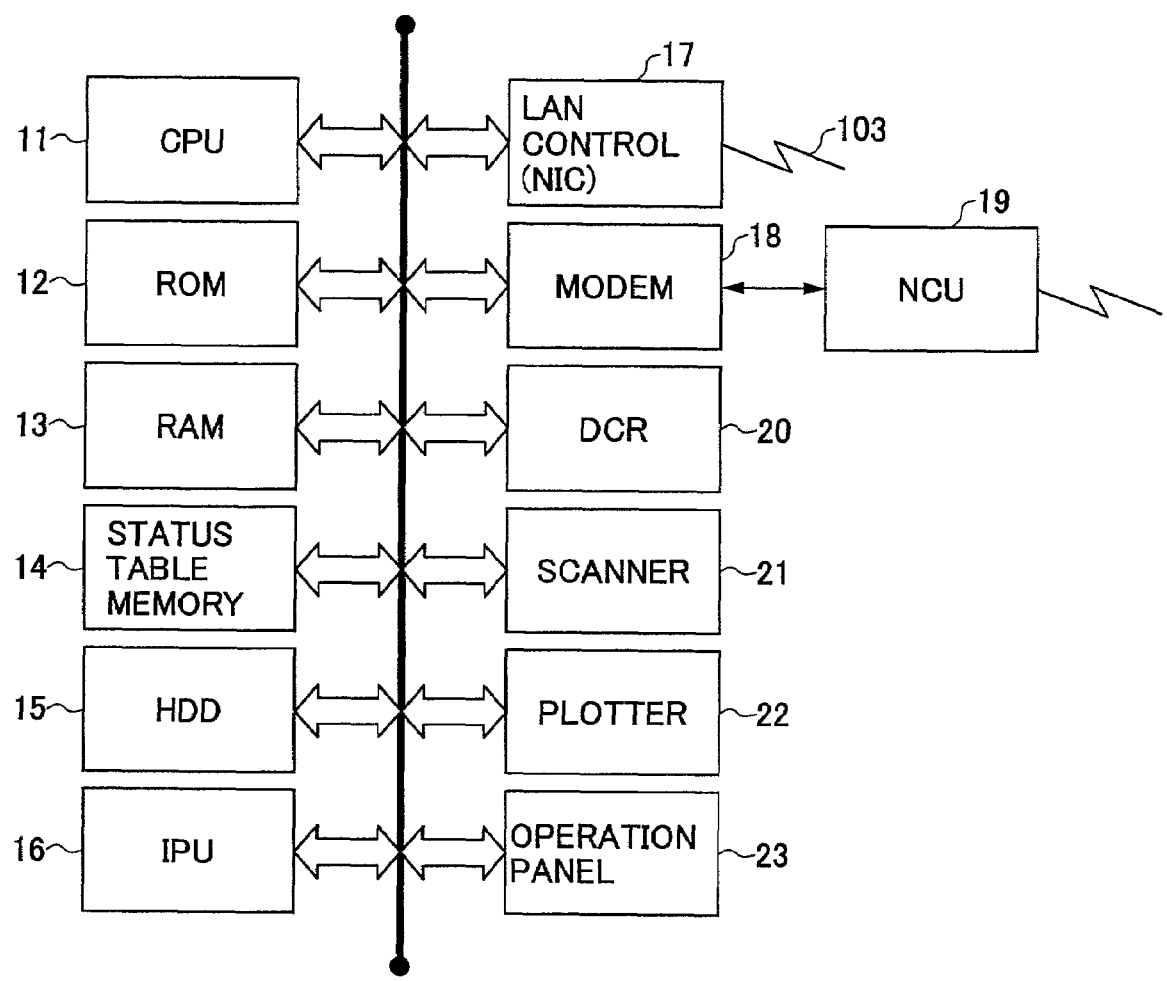
FIG. 2 is a block diagram of an image processing apparatus according to one aspect of the present invention.

FIG. 2 shows an image processing apparatus according to one aspect of the present invention. The image processing apparatus of the present embodiment, shown in FIG. 2, corresponds to the digital copier 101 in the image processing system in FIG. 1.

In the image processing apparatus in FIG. 2, a CPU (central processing unit) 11, a ROM (read-only memory) 12, a RAM (random access memory) 13, a status table memory 14, a HDD (hard disk drive) 15, an IPU (image processing unit) 16, a LAN controller (or network interface card NIC) 17, a MODEM (modulator/demodulator unit) 18, a DCR (decoder/encoder unit) 20, a scanner 21, a plotter 22, and an operation panel 23 are connected onto an internal bus of the image processing apparatus. The LAN controller 17 is connected to the LAN cable 103 shown in FIG. 1. The MODEM 18 is connected to the public telephone network (for example, PSTN) via a NCU (network control unit) 19.

In the image processing apparatus in FIG. 2, the CPU 11 executes a normal operation control program that is stored in and read from the ROM 12, in order to control operations of the entire system including the scanner 21 and the plotter 22. Moreover, according to one embodiment of the present invention, the CPU 11 executes a status information holding program that is stored in and read from a HDD (hard disk drive) 15, in order to provide the function of holding the status of the execution of a series of image processing steps of the image data even when the execution of some of the image processing steps is suspended due to power-down. The RAM 13 stores necessary information when performing the facsimile control procedures, and stores the communication protocol information when performing the network control procedures. The ROM 12 is also provided as the read-only memory that stores the facsimile control procedures and the network control procedures. The status table memory 14 is a non-volatile RAM that stores the status table of the present embodiment, which indicates the status of the execution of a series of image processing steps of the image data in the image processing apparatus.

Alternatively, the status table that is stored in the status table memory 14 may be stored in the HDD 15 or a different non-volatile RAM in the image processing apparatus.

In the image processing apparatus in FIG. 2, the HDD 15 stores the status information holding program according to one embodiment of the present invention. Moreover, the HDD 15 is a mass storage device that stores facsimile image data and its appendix information received via either the network cable 103 or the public telephone network and stores image data and its appendix information obtained by using the scanner 21. The appendix information mentioned above includes a filename, an access right, a storage location parameter, an image offset parameter, an image rotation parameter, a color parameter, a user parameter, a time parameter, a current access state parameter, a sheet parameter, a compression parameter, various matrix parameters, an image data validity parameter, a stored application program parameter, a size parameter, a resolution parameter, a gray-level parameter, an extracted document parameter, a password, a page parameter, a pixel-number parameter, an image processing parameter, an image quality mode parameter, and a keyword parameter.

In the image processing apparatus in FIG. 2, the scanner 21 is an image reading device that optically reads an image from an original document and is needed before transmitting facsimile image data to another facsimile terminal via the public telephone line. The plotter 22 is an image printing device that prints out the image data, stored in the HDD 15 or received from another facsimile terminal, on a copy sheet.

In the image processing apparatus in FIG. 2, the MODEM 18 provides modulation of the image data that is digitized after the image reading, to enable the digital copier 101 to transmit the modulated image data over the telephone line, and provides demodulation of the image data in the form of analog waves that is received from the telephone line, in order to store digitally the demodulated image data in the HDD 15. The NCU 19 is a DTMF (dial-tone multi-frequency) signal detector that detects and analyzes a DTMF signal which is received from another terminal via the telephone line. The DCR 20 provides compression of the digital image data optically read by the scanner 21, to produce the encoded image data before the transmission, and provide decompression of the encoded image data received from another terminal, to produce the reconstructed image data that can be printed on a copy sheet by the plotter 22.

In the above-described embodiment, the DCR 20 is provided as a signal component of the digital copier 101. Alternatively, the DCR 20 may be incorporated into the IPU 16 or another component of the digital copier 101.

Further, in the image processing apparatus in FIG. 2, the operation panel 23 includes a set of ten keys, a start/stop key, other keys, an operational display, and a set of operational indicators. The operation panel 23 is an input/output device that is used by the operator to handle or manipulate the digital copier 101. The LAN controller 17 connects the digital copier 101 with the personal computer 102 or the backup server 104 via the LAN cable 103. The LAN controller 17 decodes the data received from the LAN cable (or network cable) 103, to provide decompression of the encoded data received. The LAN controller 17,encodes the data being sent to the LAN cable 103, to produce the encoded image data before the transmission. The LAN controller 17 is a network-control LSI (large scale integration) that performs the buffering of transmitting frames and receiving frames. The IPU 16 is an image processing unit that performs a series of image processing steps of the image data optically read by the scanner 21.

Figure 3:
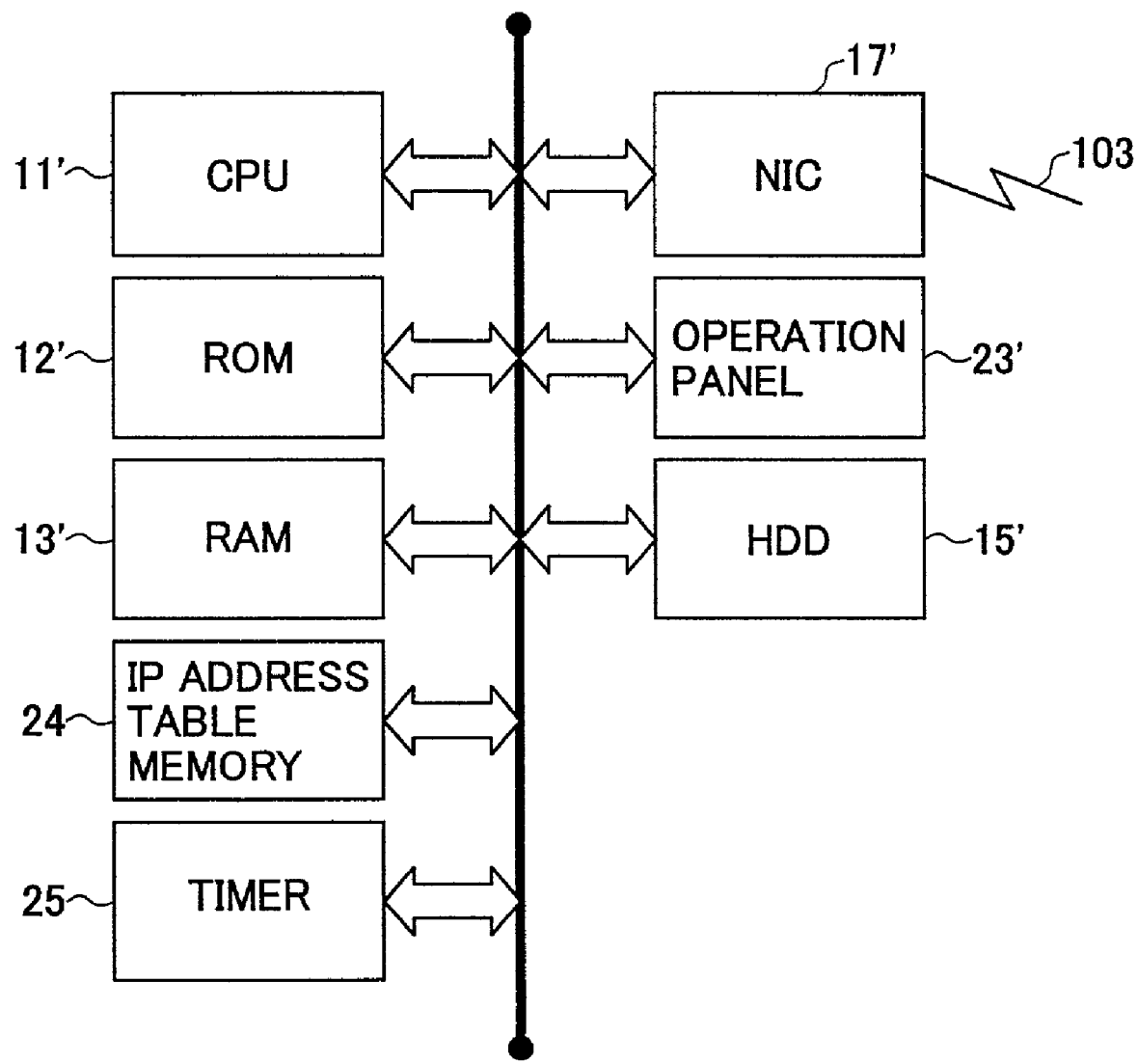
FIG. 3 is a block diagram of a backup server according to one aspect of the present invention.

FIG. 3 shows a backup server according to one aspect of the present invention. The backup server of the present embodiment, shown in FIG. 3, corresponds to the backup server 104 in the image processing system in FIG. 1.

In the backup server in FIG. 3, a CPU 11', a ROM 12', a RAM 13', an IP address table memory 24, a HDD 15', a timer 25, a LAN controller 17', and an operation panel 23' are connected onto an internal bus of the backup server. The LAN controller 17' is connected to the LAN cable 103 shown in FIG. 1.

In the backup server in FIG. 3, the CPU 11' executes a normal operation control program that is stored in and read from the ROM 12', in order to control operations of the entire backup server. In particular, the CPU 11' controls the storage and management of the image data received from the digital copier 101 via the LAN cable 103. The RAM 13' is provided to store the communication protocol information when performing the network control procedures. The ROM 12' is provided as the read-only memory that stores the network control procedures. The IP address table memory 24 is a non-volatile RAM that stores an IP address table, and this IP address table provides an IP address of a source station (for example, the digital copier 101) on the LAN cable 103 from a phone number of the source station. The IP address table stored in the memory 24 provides the one-to-one correspondence between the phone numbers of respective computers or workstations on the LAN and the IP addresses of the respective computers on the Internet. The timer 25 is provided to measure a predetermined length of time in order to periodically update the IP address table in the IP address table memory 24.

In the backup server in FIG. 3, the operation panel 23' is an input/output device that is used by the operator to handle or manipulate the backup server 104. The LAN controller (or network interface card NIC) 17' connects the backup server 104 with the personal computer 102 or the digital copier 101. The LAN controller 17' decodes the data received from the LAN cable (or network cable) 103, to provide decompression of the encoded data received. The LAN controller 17' encodes the data being sent to the LAN cable 103, to produce the encoded data before the transmission. The LAN controller 17' is a network-control LSI that performs the buffering of transmitting frames and receiving frames. The HDD 15' is a mass storage backup device that stores facsimile image data (or the image data received from the digital copier 101) and its appendix information received via the network cable 103.

The personal computer 102 in the image processing system in FIG. 1, which is not shown specifically, includes a CPU, a RAM, a ROM, an input device, an output device, and a LAN controller (or network interface card). In the personal computer 102, the CPU controls operation of the entire personal computer. The RAM stores necessary information when performing the network and image control procedures, and stores the communication protocol information when performing the network control procedures. The ROM stores a program being executed by the CPU, and stores the network control procedures. The input device includes a mouse and a keyboard and is used by the operator to send image handling instructions to the digital copier 101. The output device includes a CRT display that provides the operator with operational information of the backup server 104 in a visible manner. The LAN controller is provided to connect the personal computer 102 with the digital copier 101 or the backup server 104 via the LAN cable 103. The LAN controller decodes the data received from the LAN cable 103, to provide decompression of the encoded data received. The LAN controller encodes the data being sent to the LAN cable 103, to produce the encoded image data before the transmission.

The personal computer 102 in FIG. 1 has the function of accessing the image data and the appendix information stored in the HDD 15 of the digital copier 101 through the data communication. By accessing the image data and the appendix information of the HDD 15, the personal computer 102 is capable of sending a print command to the digital copier 101 so that an image of the stored image data is printed out by the plotter 22 of the digital copier 101, and the personal computer 102 is capable of sending a re-transmission command to the digital copier 102 so that the stored image data is transmitted from the digital copier 101 to the personal computer 102.

Further, the personal computer 102 is capable of sending an image transfer command to the digital copier 101 or the backup server 104 so that the stored image data is transmitted to another workstation (a communication terminal or a different backup server) on the LAN 103 (or the public telephone network).

Figure 4:
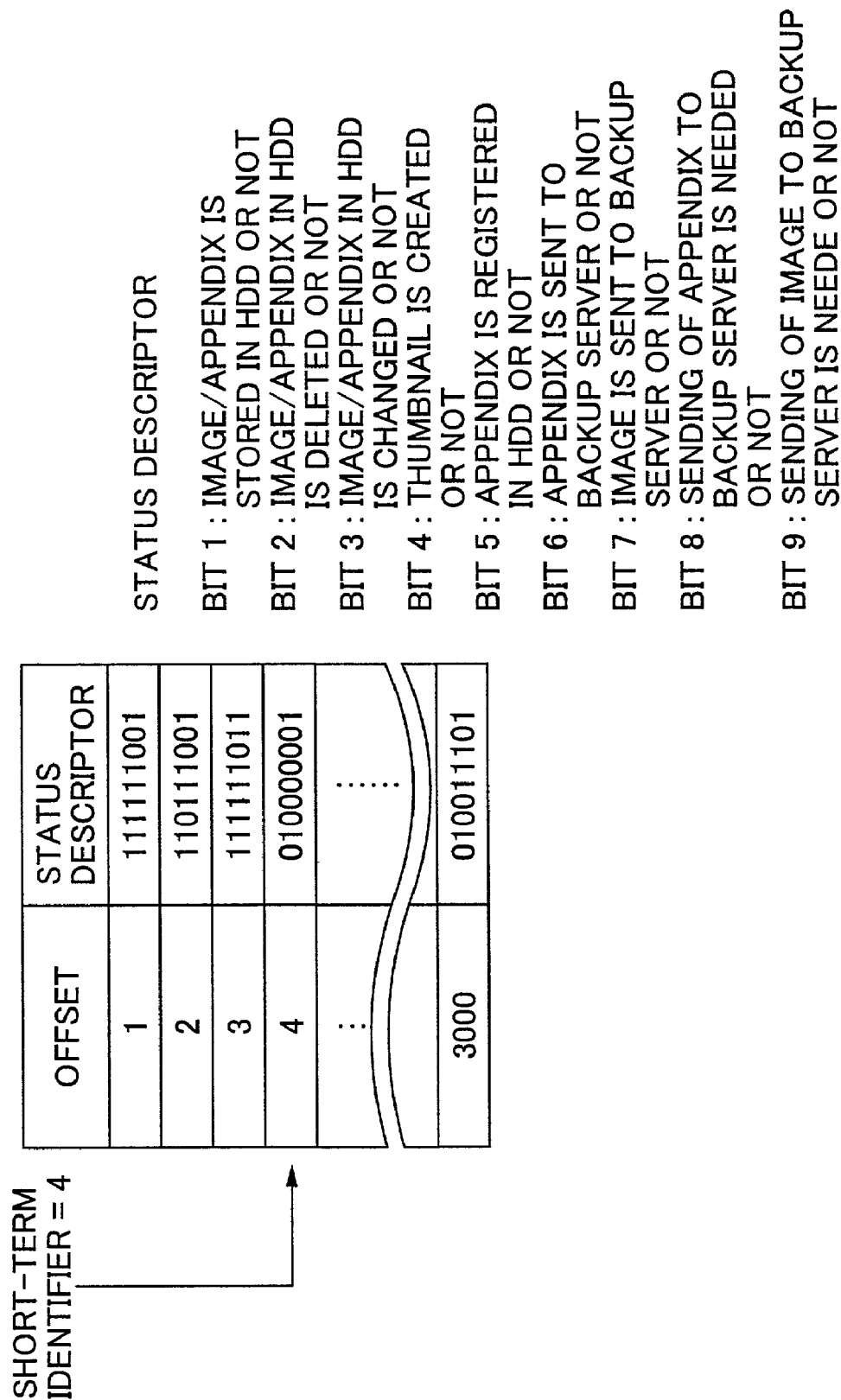
FIG. 4 is a diagram for explaining a status table that is provided in the present embodiment of the image processing apparatus in FIG. 2.

FIG. 4 shows a status table that is stored in the status table memory 14 of the image processing apparatus 101 in FIG. 2.

As shown in FIG. 4, the status table of the present embodiment is configured so that respective status descriptors corresponding to various image data are arranged on the basis of the value of a short-term identifier. In the status table of the present embodiment, the status descriptor is comprised of nine bits, and the contents of the status descriptor, held by these bits, represent a particular status of the execution of the series of image processing steps with respect to each of the image data stored in the HDD 15 of the digital copier 101. In the present embodiment, the identifier is grouped into two categories: a short-term identifier and a long-term identifier. The short-term identifier is determined based on the upper-limit number of the image data files that can be stored in the HDD 15. The long-term identifier is correlated with the short-term identifier. The long-term identifier is incremented in the sequence of storage of the image data into the HDD 15. By using the above-described identifier, it is possible to uniquely identify each of the various image data files stored in the HDD 15 of the image processing apparatus 101 or the HDD 15' of the backup server 104.

As described above, each of the status descriptors in the status table of the present embodiment is stored in the status table memory 14, and it represents a particular status of the execution of the series of image processing steps of the related image data in the HDD 15 of the image processing apparatus 101. Specifically, as shown in FIG. 4, the value (1 or 0) of the first bit (BIT 1) of the status descriptor, which is the least significant bit LSB, indicates whether the image data and its appendix information are stored in the HDD 15 or not. The value of the second bit (BIT 2) indicates whether the image data or its appendix information in the HDD 15 is deleted or not. The value of the third bit (BIT 3) indicates whether the image data or its appendix information in the HDD 15 is changed or not. The value of the fourth bit (BIT 4) indicates whether the thumbnail of the image data is created or not. The value of the fifth bit (BIT 5) indicates whether the appendix information of the image data is registered in the HDD 15 or not. The value of the sixth bit (BIT 6) indicates whether the appendix information of the image data is transmitted to the backup server 104 or not. The value of the seventh bit (BIT 7) indicates whether the image data is transmitted to the backup server 104 or not. The value of the eighth bit (BIT 8) indicates whether the transmission of the appendix information of the image data to the backup server 104 is needed or not. The value of the ninth bit (BIT 9), which is the most significant bit MSB, indicates whether the transmission of the image data to the backup server 104 is needed or not.

For example, in a case of the image data, corresponding to the short-term identifier equal to 1 (the offset address of the status table is equal to 1), in the status stable of FIG. 4, the status descriptor of the related image data in the status table indicates the following information that the transmission of both the image data and the appendix information to the backup server 104 is needed, the image data and the appendix information are stored in the HDD 14, the thumbnail of the image data is created, the appendix information is registered in the HDD 15, and the image data and the appendix information are transmitted to the backup server 104.

In a case of the image data, corresponding to the short-term identifier equal to 2, in the status table of FIG. 4, the status descriptor of the related image data in the status table indicates the following information that the transmission of both the image data and the appendix information to the backup server 104 is needed, the image data and the appendix information are stored in the HDD 14, the thumbnail of the image data is created, the appendix information is registered in the HDD 15, the appendix information is transmitted to the backup server 104, and the image data is not transmitted to the backup server 104.

In a case of the image data, corresponding to the short-term identifier equal to 3, in the status table of FIG. 4, the status descriptor of the related image data in the status table indicates the following information that the transmission of both the image data and the appendix information to the backup server 104 is needed, the image data and the appendix information are stored in the HDD 14, the thumbnail of the image data is created, the appendix information is registered in the HDD 15, the image data and the appendix information are transmitted to the backup server 104, and the image data in the HDD 15 is deleted thereafter. In this case, the first and fifth bits of the status descriptor are still set to 1, and it is found that the appendix information in the HDD 15 is not yet deleted.

In a case of the image data, corresponding to the short-term identifier equal to 4, in the status table of FIG. 4, the status descriptor of the related image data in the status table indicates the following information that the transmission of the appendix information of the related image data to the backup server 104 is needed, and after the image data is stored in the HDD 15, the thumbnail of the image data is not yet created.

When power-down occurs in the digital copier 101 in such suspended status (like the above-described status) of the execution of the series of the image processing steps of the related image data, the digital copier 101 of the present embodiment holds or retains the status table including the corresponding status descriptor for the related image data. Hence, the image processing apparatus of the present embodiment can restart the execution of such suspended image processing steps based on the contents of the status table when the image processing apparatus is powered up again after the power-down.

Specifically, in the case of the image data, corresponding to the short-term identifier equal to 1, in the status stable of FIG. 4, when power-down occurs, the image processing apparatus 101 determines, based on the status descriptor of the related image data in the status table, that the image data and its appendix information are already transmitted to the backup server 104. Hence, when the image processing apparatus 101 is powered up again after the power-down, it is determined that the transmission of the image data and the appendix information to the backup server 104 is not needed.

In the case of the image data, corresponding to the short-term identifier equal to 2, in the status stable of FIG. 4, when power-down occurs, the image processing apparatus 101 determines, based on the status descriptor of the related image data in the status table, that the image data is not transmitted to the backup server 104. When the image processing apparatus 101 is powered up again after the power-down, it is determined that the transmission of the image data to the backup server 104 is needed. Thus, at the time of the restart, the image processing apparatus 101 enqueues the image data to the queue of the image data transmission based on the contents of the status table.

In the case of the image data, corresponding to the short-term identifier equal to 3, in the status stable of FIG. 4, when power-down occurs, the image processing apparatus 101 determines, based on the status descriptor of the related image data in the status table, that the image data in the HDD 15 is deleted. When the image processing apparatus 101 is powered up again after the power-down, it is determined that the deletion of the thumbnail and the deletion of the appendix information are needed. Thus, at the time of the restart, the image processing apparatus 101 enqueues the thumbnail of the image data to the queue of the thumbnail deletion and enqueues the appendix information to the queue of the appendix information deletion, based on the contents of the status table.

In the case of the image data, corresponding to the short-term identifier equal to 4, in the status stable of FIG. 4, when power-down occurs, the image processing apparatus 101 determines, based on the status descriptor of the related image data in the status table, that the image data is just stored in the HDD 15. When the image processing apparatus 101 is powered up again after the power-down, it is determined that the creation of the thumbnail and the registration of the appendix information in the HDD 15 are needed. Thus, at the time of the restart, the image processing apparatus 101 enqueues the thumbnail of the image data to the queue of the thumbnail creation and enqueues the appendix information to the queue of the appendix information registration, based on the contents of the status table. In this case, after the thumbnail creation and the appendix information registration are performed, the image processing apparatus 101 continuously enqueues the image data and the appendix information to the queue of the image data and appendix information transmission if such is needed.

FIG. 5A, FIG. 5B and FIG. 5C show some routines of a status table update procedure performed by the CPU 11 of the image processing apparatus of the present embodiment. These routines are repeatedly executed by the CPU 11 of the image processing apparatus 101 in parallel with the execution of a main routine of an image processing control procedure (not shown).

As shown in FIG. 5A, at a start of the first routine of the status table update procedure, the CPU 11 determines whether an image storing message indicating that the related image data is stored into the HDD 15 is received (step S101). When the result at the step S101 is affirmative, the CPU 11 enqueues the image data to the queue of the thumbnail creation (step S102). The entry in the queue of the thumbnail creation includes the related image data and the identifier identifying the related image data. When the result at the step S101 is negative or after the step S102 is performed, the control of the CPU 11 is transferred to the step S101 so that the step S101 is performed repeatedly.

As shown in FIG. 5B, at a start of the second routine of the status table update procedure, the CPU 11 determines whether there is an entry in the queue of the thumbnail creation (step S103). When the result at the step S103 is affirmative, the CPU 11 performs the thumbnail creation of the image data indicated by the identifier included in the entry (step S104). After the step S104 is performed, the CPU 11 updates the status descriptor of the related image data in the status table (step S105). After the step S105 is performed, the CPU 11 enqueues the appendix information of the related image data to the queue of the appendix information registration (step S106). The entry in the queue of the appendix information registration includes the appendix information of the related image data and the identifier identifying the related image data. When the result at the step S103 is negative or after the step S106 is performed, the control of the CPU 11 is transferred to the step S103 so that the step S103 is performed repeatedly.

As shown in FIG. 5C, at a start of the third routine of the status table update procedure, the CPU 11 determines whether there is an entry in the queue of the appendix information registration (step S107). When the result at the step S107 is affirmative, the CPU 11 performs the appendix information registration of the appendix information of the image data indicated by the identifier included in the entry (step S108). In the step S108, the appendix information is registered in the HDD 15. After the step S108 is performed, the CPU 11 updates the status descriptor of the related image data in the status table (step S109). After the step S109 is performed, the CPU 11 enqueues the appendix information of the related image data to the queue of the appendix information transmission (step S110). The entry in the queue of the appendix information transmission includes the appendix information of the related image data and the identifier identifying the related image data. When the result at the step S107 is negative or after the step S110 is performed, the control of the CPU 11 is transferred to the step S107 so that the step S107 is performed repeatedly.

Figure 6C:
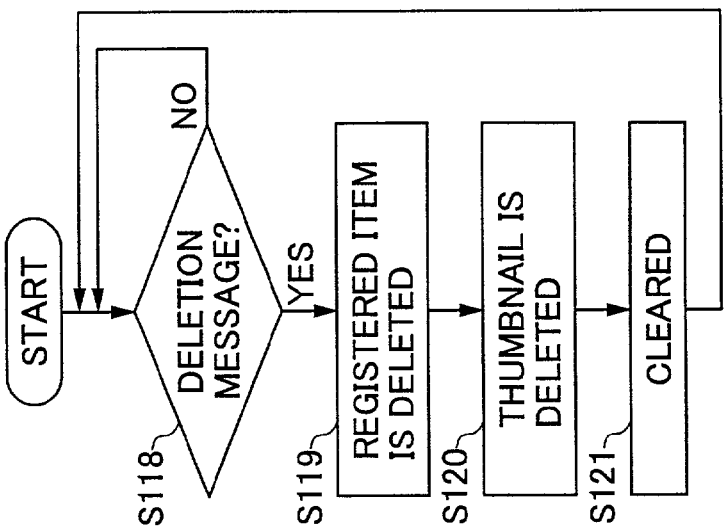
FIG. 6A, FIG. 6B and FIG. 6C are flowcharts for explaining other routines of the status table update procedure performed by the image processing apparatus of the present embodiment.
Figure 6B:
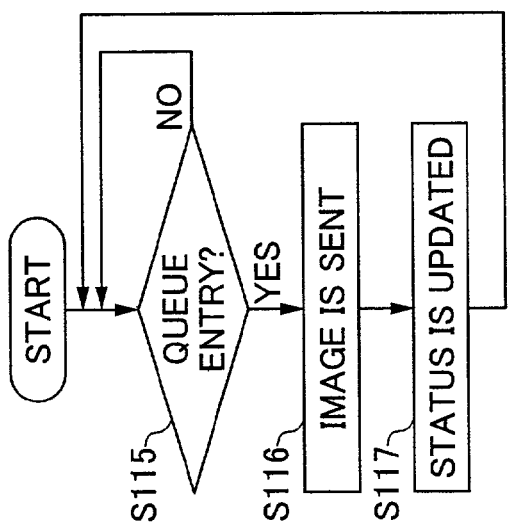
Figure 6A:
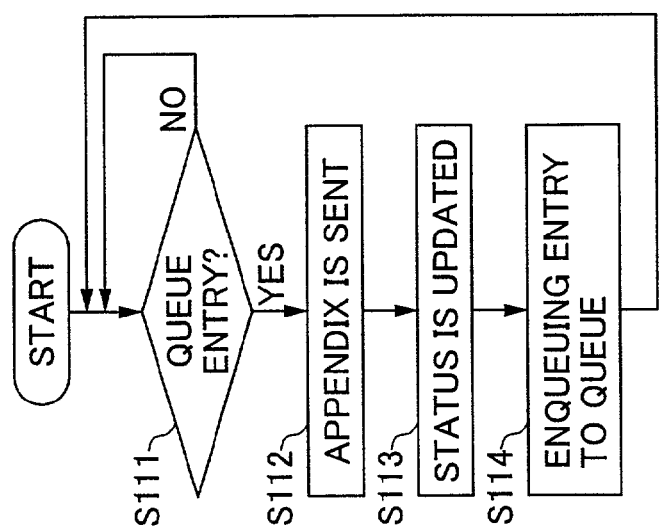

Next, FIG. 6A, FIG. 6B and FIG. 6C show other routines of the status table update procedure performed by the CPU 11 of the image processing apparatus 101 of the present embodiment. Similar to FIG. 5A, FIG. 5B and FIG. 5C, these routines of FIG. 6A, FIG. 6B and FIG. 6C are repeatedly executed by the CPU 11 of the image processing apparatus 101 in parallel with the execution of the main routine of the image processing control procedure.

As shown in FIG. 6A, at a start of the fourth routine of the status table update procedure, the CPU 11 determines whether there is an entry in the queue of the appendix information transmission (step S111). When the result at the step S111 is affirmative, the CPU 11 performs the transmission of the appendix information of the image data indicated by the identifier included in the entry (step S112). The appendix information is transmitted to the backup server 104. After the step S112 is performed, the CPU 11 updates the status descriptor of the related image data in the status table (step S113). After the step S113 is performed, the CPU 11 enqueues the related image data to the queue of the image data transmission (step S114). The entry in the queue of the image data transmission includes the related image data and the identifier identifying the related image data. When the result at the step S111 is negative or after the step S114 is performed, the control of the CPU 11 is transferred to the step S111 so that the step S111 is performed repeatedly.

As shown in FIG. 6B, at a start of the fifth routine of the status table update procedure, the CPU 11 determines whether there is an entry in the queue of the image data transmission (step S115). When the result at the step S115 is affirmative, the CPU 11 performs the transmission of the image data indicated by the identifier included in the entry (step S116). The related image data is transmitted to the backup server 104. After the step S116 is performed, the CPU 11 updates the status descriptor of the related image data in the status table (step S117). When the result at the step S115 is negative or after the step S117 is performed, the control of the CPU 11 is transferred to the step S115 so that the step S115 is performed repeatedly.

As shown in FIG. 6C, at a start of the sixth routine of the status table update procedure, the CPU 11 determines whether an image data deletion message, indicating that the image data in the HDD 15 is deleted, is received (step S118). When the result at the step S118 is affirmative, the CPU 11 performs the deletion of the appendix information of the related image data registered in the HDD 15 (step S119). After the step S119 is performed, the CPU 11 performs the deletion of the thumbnail of the related image data in the HDD 15 (step S120). After the step S120 is performed, the CPU 11 clears the status descriptor of the related image data in the status table into the initial state (step S121). When the result at the step S118 is negative or after the step S121 is performed, the control of the CPU 11 is transferred to the step S118 so that the step S118 is performed repeatedly.

Figure 7:
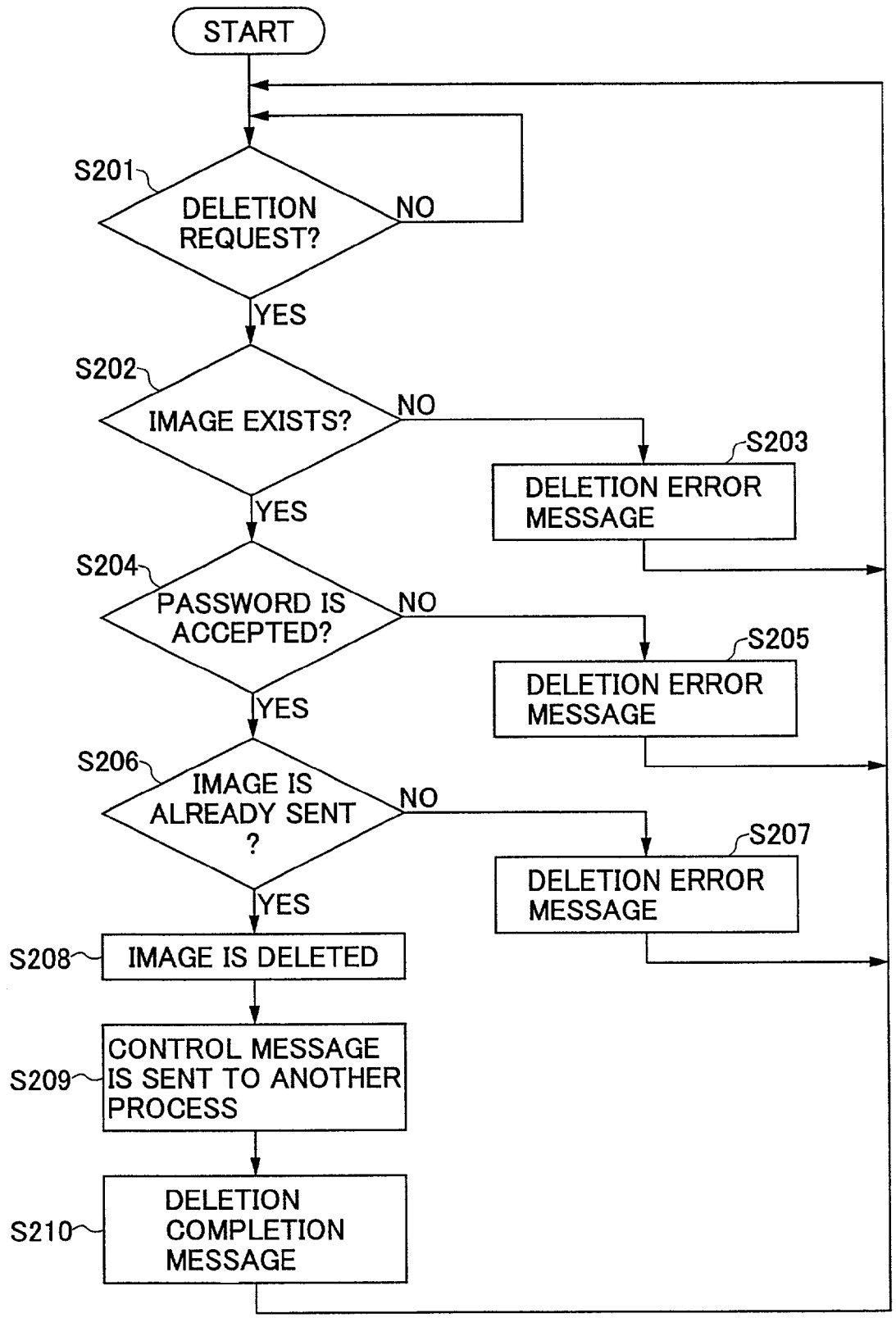
FIG. 7 is a flowchart for explaining an image data deletion procedure performed by the image processing apparatus of the present embodiment.

FIG. 7 shows an image data deletion procedure performed by the CPU 11 of the image processing apparatus of the present embodiment.

As shown in FIG. 7, at a start of the image data deletion procedure, the CPU 11 determines whether an image data deletion request, indicating that the deletion of the related image data stored in the HDD 15 is requested, is received (step S201). This deletion request is sent by either the operation panel 23 of the digital copier 101 or the personal computer 102 connected to the digital copier 101 via the LAN cable 103. The deletion request includes the identifier identifying the related image data and the operational information indicating the image data deletion. When the result at the step S201 is affirmative, the CPU 11 determines whether the related image data indicated by the identifier included in the deletion request exists in the HDD 15 (step S202). When the result at the step S201 is negative, the control of the CPU 11 is transferred to the step S201 so that the step S201 is performed repeatedly. When the result at the step S202 is negative, the CPU 11 transmits a deletion error message to the requesting device, which is either the operation panel 23 or the personal computer 102 (step S203). The deletion error message indicates that the related image data does not exist in the HDD 15, and it is displayed on the requesting device (either the operational display of the operation panel 23 or the CRT display of the computer 102). After the step S203 is performed, the control of the CPU 11 is transferred to the step S201 so that the step S201 is performed repeatedly.

When the result at the step S202 is affirmative, the CPU 11 requests the operator on the requesting device (the operation panel 23 or the personal computer 102) to input a password, and determines whether the input password matches with a registered password assigned to the related image data (step S204). When the result at the step S204 is negative, the CPU 11 transmits a deletion error message to the requesting device (step S205). The deletion error message indicates that the input password does not match with the registered one, and it is displayed on the requesting device. After the step S205 is performed, the control of the CPU 11 is transferred to the step S201 so that the step S201 is performed repeatedly.

When the result at the step S204 is affirmative, the CPU 11 accesses the status descriptor of the related image data in the status table memory 14, and determines whether the related image data is transmitted to the backup server 104, based on the status descriptor of the related image data (step S206). When the result at the step S206 is negative, the CPU 11 transmits a deletion error message to the requesting device (step S207). The deletion error message indicates that the related image data is not yet transmitted to the backup server 104, and it is displayed on the requesting device. After the step S207 is performed, the control of the CPU 11 is transferred to the step S201 so that the step S201 is performed repeatedly.

When the result at the step S206 is affirmative, the CPU 11 performs the deletion of the related image data in the HDD 15 (step S208). After the step S208 is performed, the CPU 11 transmits a control message to another process (step S209). After the step S209 is performed, the CPU 11 transmits a deletion completion message to the requesting device (S210). The deletion completion message indicates that the related image data in the HDD 15 is deleted, and it is displayed on the requesting device, which is either the operation panel 23 or the personal computer 102. After the step S210 is performed, the control of the CPU 11 is transferred to the step S201 so that the step S201 is performed repeatedly.

Figure 8:
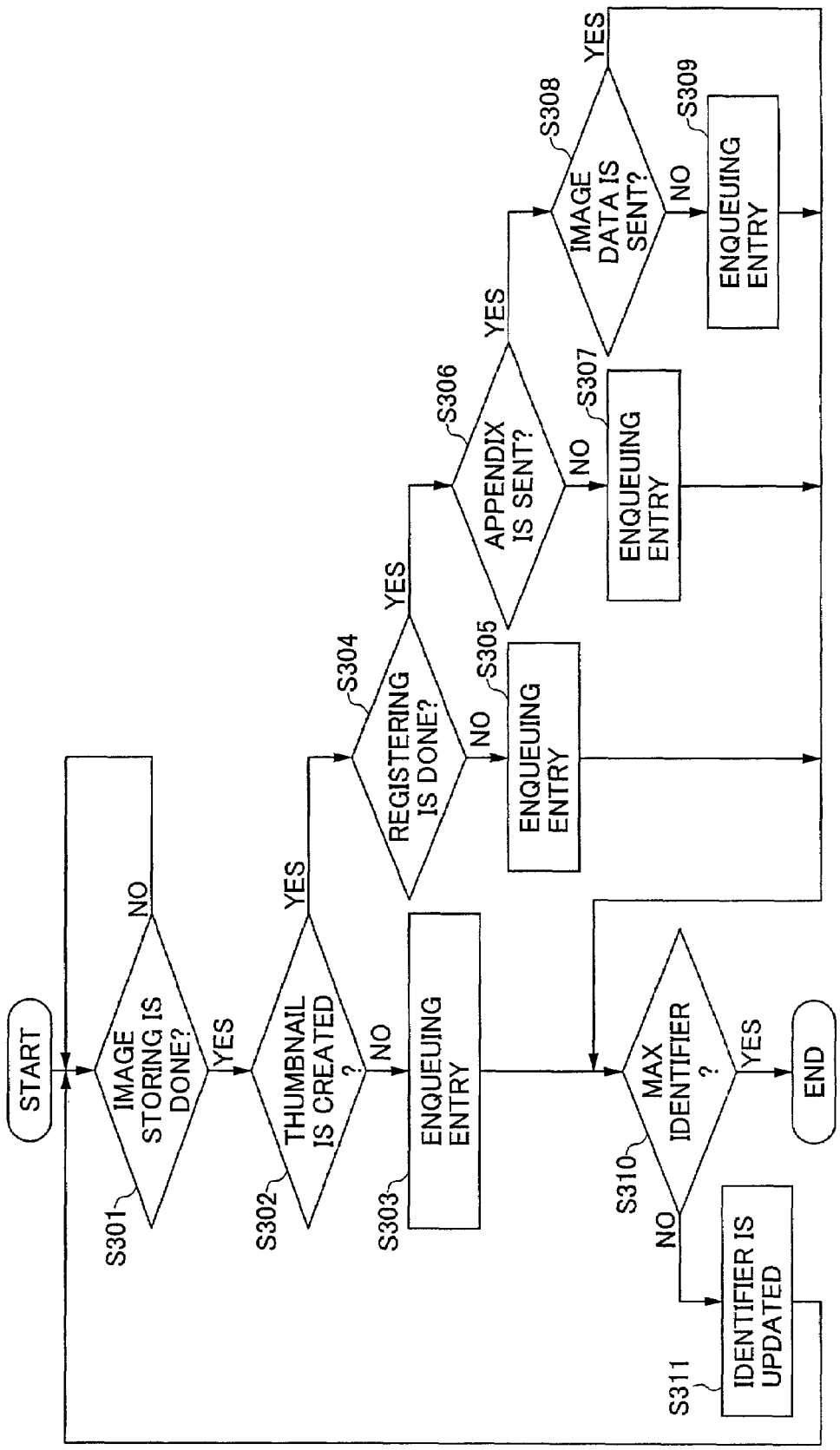
FIG. 8 is a flowchart for explaining an image processing control procedure performed by the image processing apparatus of the present embodiment when the image processing apparatus is powered up after power-down.

FIG. 8 shows an image processing control procedure performed by the CPU 11 of the image processing apparatus of the present embodiment when the image processing apparatus is powered up after power-down.

As shown in FIG. 8, at a start of the image processing control procedure, the CPU 11 accesses the status descriptor of the related image data in the status table memory 14, and determines whether the related image data, indicated by the identifier (corresponding to the status descriptor of the related image data in the status table), is already stored in the HDD 15, based on the status descriptor of the related image data (step S301). When the result at the step S301 is affirmative, the CPU 11 determines whether the thumbnail creation of the related image data is already done, based on the status descriptor of the related image data (step S302). When the result at the step S302 is negative, the CPU 11 enqueues the related image data to the queue of the thumbnail creation (step S303). The entry in the queue of the thumbnail creation includes the related image data and the identifier identifying the related image data.

When the result at the step S302 is affirmative (the thumbnail is created), the CPU 11 determines whether the registration of the appendix information of the related image data into the HDD 15 is already done, based on the status descriptor of the related image data (step S304). When the result at the step S304 is negative, the CPU 11 enqueues the appendix information of the related image data to the queue of the appendix information registration (step S305). The entry in the queue of the appendix information registration includes the appendix information of the related image data and the identifier identifying the related image data.

When the result at the step S304 is affirmative (the appendix information is registered), the CPU 11 determines whether the transmission of the appendix information of the related image data to the backup server 104 is already done, based on the status descriptor of the related image data (step S306). When the result at the step S306 is negative, the CPU 11 enqueues the appendix information of the related image data to the queue of the appendix information transmission (step S307). The entry in the queue of the appendix information transmission includes the appendix information of the related image data and the identifier identifying the related image data.

When the result at the step S306 is affirmative (the appendix information is transmitted), the CPU 11 determines whether the transmission of the related image data to the backup server 104 is ARCS already done, based on the status descriptor of the related image data (step S308). When the result at the step S308 is negative, the CPU 11 enqueues the related image data to the queue of the image data transmission (step S309). The entry in the queue of the image data transmission includes the related image data and the identifier identifying the related image data.

When the result at the step S308 is affirmative, or after one of the steps S303, S305, S307 and S309 is performed, the CPU 11 determines whether the identifier of the related image data is equal to a predetermined maximum identifier (step S310). When the result at the step S310 is affirmative, the image processing control procedure of FIG. 8 ends. When the result at the step S310 is negative, the CPU 11 updates the identifier by incrementing it by 1 (step S311). After the step S311 is performed, the control of the CPU 11 is transferred to the step S301 so that the step S301 is performed repeatedly with the incremented identifier.

In the above-described embodiment, the status table wherein each of the respective status descriptors corresponding to the various image data represents a particular status of the execution of the series of image processing steps of each image data in the HDD 15, is stored or retained in the status table memory 14. Alternatively, another status table may be stored in the memory 14 of the image processing apparatus.

Figure 9:
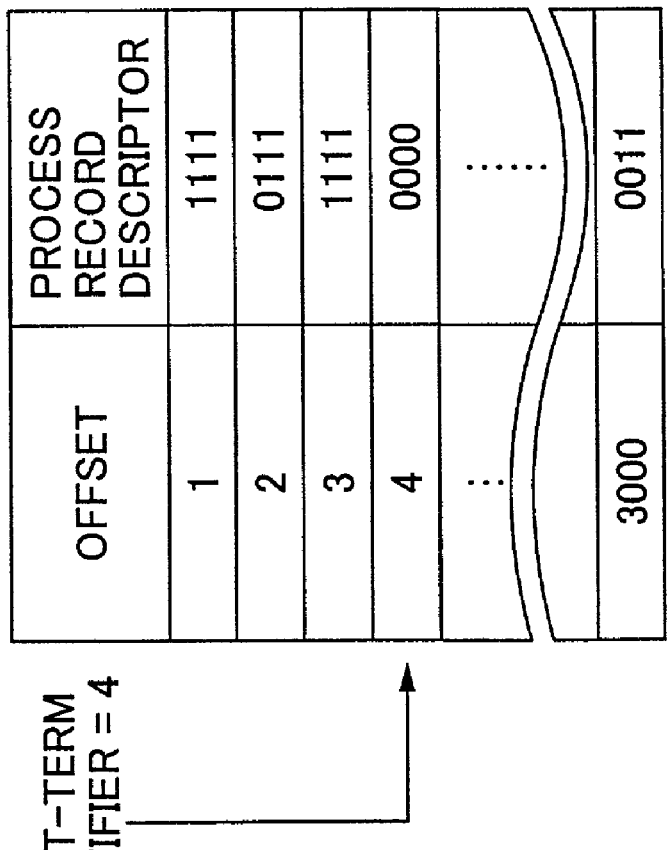
FIG. 9 is a diagram of a process record table that is provided in another embodiment of the image processing apparatus of the invention.

FIG. 9 shows a process record table that is provided in another embodiment of the image processing apparatus of the invention.

As shown in FIG. 9, the process record table of the present embodiment is configured so that respective process record descriptors corresponding to various image data are arranged on the basis of the value of a short-term identifier. In the process record table of the present embodiment, the process record descriptor is comprised of four bits, and the contents of the process record descriptor, held by these bits, represent a particular state of the execution of the series of image processing steps with respect to each of the various image data stored in the HDD 15 of the digital copier 101.

In the present embodiment, each of the process record descriptors of the process record table is stored in the memory 14 of the image processing apparatus 101, and it represents a particular status of the execution of the series of image processing steps of the related image data in the HDD 15 of the image processing apparatus 102. Specifically, as shown in FIG. 9, the value (1 or 0) of the first bit (BIT 1) of the process record descriptor, which is the least significant bit LSB, indicates whether the thumbnail of the image data is created or not. The value of the second bit (BIT 2) indicates whether the appendix information of the image data is registered in the HDD 15 or not. The value of the third bit (BIT 3) indicates whether the appendix information of the image data is transmitted to the backup server 104 or not. The value of the fourth bit (BIT 4), which is the most significant bit MSB, indicates whether the image data is transmitted to the backup server 104 or not.

Even when power-down occurs in the image processing apparatus 101 during the execution of the series of the image processing steps of the related image data, the image processing apparatus 101 of the present embodiment holds or retains the above-described process record table of FIG. 9 including the corresponding process record descriptor for the related image data. Hence, the image processing apparatus of the present embodiment can restart the execution of such suspended image processing steps based on the contents of the process record table when the image processing apparatus is powered up again after the power-down.

As described above, in the image processing system including the image processing apparatus (digital copier) 101, the personal computer 102 and the backup server 104 which are connected together via the LAN cable 103, the image processing apparatus 101 is configured to include the HDD 15, the status table memory 14 and the CPU 11, wherein the HDD 15 stores various image data, the status table memory 14 stores the status table having the respective status descriptors, corresponding to the various image data, each indicating a status of the execution of the series of image processing steps of the related image data, and the CPU 11 performs the status table update procedure of FIG. 5A through FIG. 6C, the image data deletion procedure of FIG. 7, and the image processing control procedure of FIG. 8. Accordingly, the image processing apparatus of the present embodiment makes it possible to hold the status of the execution of the series of image processing steps even when the execution of some of the image processing steps is suspended due to power-down. It is possible for the image processing apparatus of the present embodiment to easily restart the execution of such suspended image processing steps based on the held status of the execution when the image processing apparatus is powered up again after the power-down.

The HDD 15 or the like in the above-described embodiment constitutes an image storing device in the claims, the status table memory 14 or the like in the above-described embodiment constitutes a status retaining device in the claims, and the LAN controller 17 or the like in the above-described embodiment constitutes a communication unit in the claims.

The present invention is not limited to the above-described embodiments, and variations and modifications may be made without departing from the scope of the present invention.

Further, the present invention is based on Japanese priority application No. 2001-027753, filed on Feb. 5, 2001, the entire contents of which are hereby incorporated by reference.

What is claimed is:

1. An image processing apparatus, comprising:
   a communication unit configured to transmit image data from the image processing apparatus to an external device via a network and to receive image data from the external device via the network;
   an image storage device configured to store a plurality of image data;
   a status holding unit configured to hold a status table having respective status descriptors and identifiers which identify each of files of image data,
   wherein said status descriptors are arranged based on the identifiers in the status table, the status descriptors corresponding to the plurality of image data in the image storage device,
   wherein each status descriptor comprises:
   a data storage completion descriptor unit configured to indicate whether storage of related image data, related to the status descriptor and identified by the identifier, into the image storage device is completed or not;
   a data transmission descriptor unit configured to indicate whether transmission of the related image data from the image storage device to the external device via the network is needed or not
   a data transmission completion descriptor unit indicating whether transmission of the related image data from the image storage device to the external device via the network is completed or not
   wherein the image processing apparatus is configured so that, when the image processing apparatus is powered up after power-down, one of the status descriptors of a related image data identified by the identifier is accessed from the status holding unit, and
   when the data storage completion descriptor unit of the accessed status descriptor indicates that storage of the related image data into the image storage device is not completed, the image processing apparatus queues the related image data to an image storage queue for the storage of the related image data, and
   when the data storage completion descriptor unit of the accessed status descriptor indicates that storage of the related image data into the image storage device is completed, and the data transmission descriptor unit of the accessed status descriptor indicates that transmission of the related image data from the image storage device to the external device via the network is needed, and the data transmission completion descriptor unit of the accessed status descriptor indicates that transmission of the related image data from the image storage device to the external device via the network is not completed, the image processing apparatus queues the related image data to an image data transmission queue for the transmission of the related image data.

2. The image processing apparatus according to claim 1, wherein, when the image processing apparatus is powered up after power-down, the image processing apparatus determines a particular one of a series of image processing steps of the related image data that was performed last, based on a corresponding one of the status descriptors in the status table held by the status holding unit, and the image processing apparatus restarts execution of a following one of the series of image processing steps of the related image data that follows the last image processing step.

3. The image processing apparatus according to claim 1, further comprising a control unit which determines a particular one of a series of image processing steps of the related image data that was performed last, based on a corresponding one of the status descriptors in the status table held by the status holding unit.

4. The image processing apparatus according to claim 1, further comprising a control unit which updates a corresponding one of the status descriptors in the status table, held by the status holding unit, every time an image processing step of the related image data is performed.

* * * * *